Patented Dec. 5, 1950

2,532,519

UNITED STATES PATENT OFFICE 2,532,519

ARYL DIGUANAMINES

John Kenson Simons, Toledo, Ohio, assignor to Libbey-Owens-Ford Glass Company, Toledo, Ohio, a corporation of Ohio No Drawing. Application January 2, 1948, Serial No. 347

8 Claims. (Cl. 260—249.9)

The invention relates to novel carbon compounds that are diguanamines and, more particularly, complex aryl diguanamines.

A guanamine is considered to be a derivative of a carboxylic acid in which the carboxy group is replaced by a 4,6-diamino-2-triazinyl radical. Hence an aryl diguanamine may be considered to be a derivative of an aryl dicarboxylic acid in which each of the two carboxy groups is replaced by a 4,6-diamino-2-triazinyl radical.

The aryl diguanamines heretofore known have been diguanamines in which the aryl radical had a simple molecular structure and, even then, such diguanamines have been obtainable only by methods that employ expensive starting materials and are difficult and expensive to carry out, so that the aryl diguanamines heretofore known have been too expensive for ordinary commercial use. United States Patent No. 2,425,287, issued to Thurston and Nagy on August 5, 1947, discloses a process whereby it is possible to prepare a simple aryl diguanamine in which the aryl radical is a phenylene radical, but it is not possible to prepare an aryl diguanamine in which the aryl radical is a naphthylene radical or any other radical more complex in structure than the phenylene radical. Moreover, the process so described involves the use of extremely expensive starting materials.

The principal object of the invention is to provide a novel class of complex aryl diguanamines that possess that possess certain desirable properties and can be prepared by inexpensive methods from relatively cheap starting materials. More specific objects and advantages are apparent from the description, which merely discloses and illustrates the invention and is not intended to impose limitations upon the claims.

An application of the diguanamines of the present invention that is of considerable commercial importance is the use of such diguanamines in the same manner as melamine for reaction with formaldehyde to produce synthetic resins. Since the aryl radical in the molecule of a diguanamine of the instant invention has a complex structure, such a diguanamine may be employed to produce synthetic resins having excellent oil-solubility as well as extremely high chemical stability and, in some cases, a high degree of flexibility. Such resins are particularly useful as finish resins.

The novel carbon compounds of the present invention have the general formula

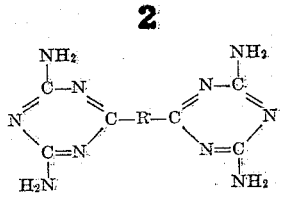

wherein —R— is a divalent aromatic radical in which the free valences are attached to different nuclear carbon atoms, containing two benzene nuclei that contain at least ten carbon atoms, and are connected by not more than twelve atoms in series, any atom in said radical other than carbon and hydrogen being an oxygen atom in an ether linkage; i. e., the novel carbon compounds of the invention are compounds in which each of the two 4,6-diamino-2-triazinyl radicals is attached to a different nuclear carbon atom in the radical —R—, and in which the radical —R— is a divalent radical each of whose free valences is in the place of a hydrogen atom attached to a benzene nucleus of any compound containing two benzene nuclei only, such as naphthalene and diphenyl; or any compound containing two benzene nuclei connected by a radical in the series from methylene to dodecamethylene; or any compound containing two benzene nuclei connected by a radical which consists of or contains an ether linkage, such as diphenyl ether or dibenzyl ether or an ether prepared by the reaction of two hydroxybenzene molecules with a molecule of dibromide corresponding to a glycol in the series from methylene glycol to decylene glycol or in the series from ethylene glycol to triethylene glycol.

The diguanamines of the present invention are unique in that they may be produced readily and inexpensively by condensing dicyandiamide with the dinitrile corresponding to an aryl dicarboxylic acid having the general formula

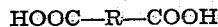

HOOC—R—COOH wherein —R— is the divalent radical hereinbefore described. Examples of such dinitriles include 2,4'-dicyanodiphenyl, 1,2-dicyanonaphthalene, 4,4'-dicyanodiphenyl methane, 4,4'-dicyanodiphenyl, 4,4'-dicyanodiphenyl ethane, 4,4'-dicyano-alpha, gamma-diphenyl propane, 4,4'-dicyanodiphenyl ether, 4-cyanophenyl 4-cyanobenzyl ether, 4,4',dicyanodibenzyl ether, and the ethers formed by the reaction of hydroxy benzonitriles (e. g., 4-hydroxy benzonitrile) with dibromides corresponding to glycols in the series from methylene glycol to decylene glycols (e. g., decamethylene glycol) and in the series from ethylene glycol to triethylene glycol.

The dinitriles may be prepared by several known methods, although the preferred procedure is carried out by reacting an organic dibromide with cuprous cyanide in a pyridine medium, according to the following general equation:

$$Br-R-Br + Cu_2(CN)_2 \rightarrow NC-R-CN + Cu_2Br_2$$

wherein —R— is the divalent radical hereinbefore described.

The condensation of dicyandiamide with the dinitrile is carried out by dissolving a strongly basic catalyst, e. g., sodium or potassium hydroxide, in a suitable primary or secondary alcoholic solvent such as benzyl alcohol or ethylene glycol monoethyl ether, adding the dinitrile and from about 2.2 to about 2.6 mols of dicyandiamide for each mol of the dinitrile, and heating to start the reaction. The reaction is then continued by heating or cooling if necessary to keep the temperature between about 100° and about 180° C. and to prevent the reaction from becoming too violent. The quantity of the alcoholic solvent used should be just sufficient to form a suspension of the precipitate that can be stirred during the reaction. When precipitation of the diguanamine is complete, the precipitate is filtered off and washed with boiling water to remove excess dicyandiamide and products of side reactions. The diguanamine may be purified by converting it to a hydrochloride and neutralizing an aqueous solution of the hydrochloride to liberate the diguanamine.

This method of preparation is versatile in that a large variety of dinitriles may be used for the reaction with dicyandiamide, to give a wide variety of diguanamines which, by reaction with formaldehyde, produce synthetic resins that have widely varied properties and therefore are suitable for various uses.

The diguanamines in which the aryl radicals consist of two benzene nuclei alone, i. e., in which R is a naphthylene or a diphenylene radical, are useful as intermediates in the production of oil-soluble synthetic resins having very high chemical stability; whereas the diguanamines in which the benzene nuclei are connected by one or more atoms in series are useful as intermediates in the production of oil-soluble synthetic resins having high chemical stability and varying degrees of flexibility. The guanamines in the latter group which are the least expensive to produce are those in which the benzene nuclei are connected to the rest of the divalent radical through an ether linkage, and of this group p,p'-bis-2,4-diamino-6-triazinyl diphenyl ether is the preferred compound.

*Example 1*

After the addition of 15.0 grams of dicyandiamide and 15.3 grams of 4,4'-dicyanodiphenyl to a solution of 8 grams of 85% (by weight) aqueous potassium hydroxide in 80 grams of methyl Cellosolve, the ingredients are stirred and heated under a reflux condenser until spontaneous boiling begins. When spontaneous boiling has ceased, the mixture is heated to continue the refluxing for three to five hours, and then the mixture is cooled and neutralized with hydrochloric acid. The precipitate which is formed during the foregoing reaction is filtered off, washed with hot water, and dried to produce an 86 per cent yield of p,p' - bis - 2,4 - diamino - 6 - triazinyl diphenyl, which melts at 390–392° C. without decomposition,

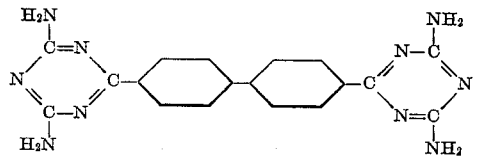

*Example 2*

After the addition of 19.3 grams of dicyandiamide and 17.0 grams of 1,2-dicyanonaphthalene to a solution of 8 grams of 85% aqueous potassium hydroxide in 80 grams of methyl Cellosolve, the ingredients are stirred and heated under a reflux condenser until spontaneous boiling begins. When spontaneous boiling has ceased, the mixture is heated to continue the refluxing for three to five hours, and then the mixture is cooled and neutralized with hydrochloric acid. The precipitate which is formed during the foregoing reaction is filtered off, washed with hot water, and dried to produce a 79 per cent yield of 1,2-bis-2,4-diamino-6-triazinyl naphthalene, which melts at 376–380° C. without decomposition,

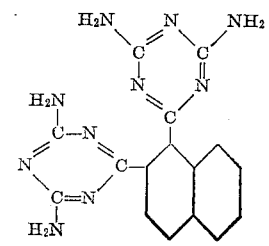

*Example 3*

After the addition of 20 grams of dicyandiamide and 22 grams of 4,4'-dicyanodiphenyl ether to a solution of 8 grams of 85% aqueous potassium hydroxide in a mixture of 80 grams of methyl Cellosolve and 50 grams of pyridine, the ingredients are stirred and heated under a reflux condenser until spontaneous boiling begins. When the spontaneous boiling has ceased, the mixture is heated to continue the refluxing for three to five hours, and then the mixture is cooled and neutralized with hydrochloric acid. The precipitate which is formed during the foregoing reaction is filtered off, washed with hot water, and dried to produce a 49 per cent yield of p,p'-bis-2,4-diamino-6-triazinyl diphenyl ether, which melts at 290° C. without decomposition,

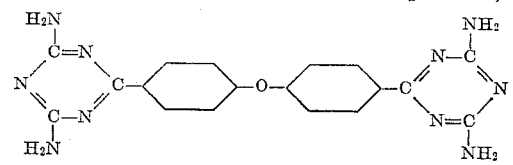

Having described the invention, I claim:
1. A novel carbon compound having the general formula

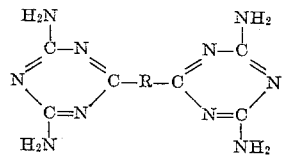

wherein —R— is a divalent aromatic radical in which the free valences are attached to different nuclear carbon atoms, containing two benzene nuclei that contain at least ten carbon atoms and are connected by not more than twelve atoms in series, any atom in said radical other than carbon and hydrogen being an oxygen atom in an ether linkage.

2. A novel carbon compound as claimed in claim 1 in which —R— is a divalent radical consisting of two benzene nuclei.

3. A novel carbon compound as claimed in claim 1 in which —R— is a naphthylene radical.

4. p,p'-Bis-2,4-diamino-6-triazinyl diphenyl.

5. A novel carbon compound as claimed in claim 1 in which —R— is a divalent radical in which the free valences are attached to carbon atoms in different benzene nuclei, each of said benzene nuclei being connected to the remainder of said radical by an ether linkage.

6. p,p'-Bis-2,4-diamino-6-triazinyl diphenyl ether.

7. A novel carbon compound having the structural formula

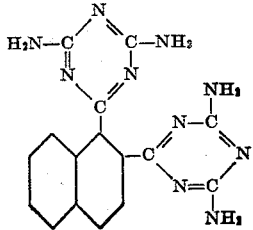

8. A novel carbon compound as claimed in claim 1 in which R is a divalent radical having the structural formula

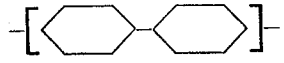

JOHN KENSON SIMONS.

REFERENCES CITED

The following references are of record in the file of this patent:

UNITED STATES PATENTS

| Number | Name | Date |
| --- | --- | --- |
| 2,302,162 | Zerweck | Nov. 17, 1942 |
| 2,309,681 | Thurston | Feb. 2, 1943 |
| 2,423,071 | Thurston | June 24, 1947 |
| 2,423,353 | Thurston | July 1, 1947 |
| 2,425,287 | Thurston | Aug. 5, 1947 |
| 2,427,315 | Thurston | Sept. 9, 1947 |
| 2,427,316 | Thurston | Sept. 9, 1947 |

FOREIGN PATENTS

| Number | Country | Date |
| --- | --- | --- |
| 552,220 | Great Britain | 1945 |